(12) United States Patent
Cooper

(10) Patent No.: US 6,901,710 B1
(45) Date of Patent: Jun. 7, 2005

(54) PULTRUDED FIBERGLASS REINFORCED PLASTIC UNDERGROUND VAULT CONSTRUCTION

(75) Inventor: Carey Cooper, Cocoa Beach, FL (US)

(73) Assignee: Featherlite Vault Structures, Inc., Bedford, PA (US)

(*) Notice: Subject to any disclaimer, the term of this patent is extended or adjusted under 35 U.S.C. 154(b) by 77 days.

(21) Appl. No.: 09/722,647

(22) Filed: Nov. 28, 2000

Related U.S. Application Data

(60) Provisional application No. 60/167,957, filed on Nov. 29, 1999.

(51) Int. Cl.[7] .................................................. E04B 1/12
(52) U.S. Cl. .............................. 52/265; 52/270; 52/284
(58) Field of Search ......................... 52/265, 270, 275, 52/276, 279, 284, 169.6; 220/567.1, 668, 4.09; 405/129.45, 129.55, 129.6, 129.8

(56) References Cited

U.S. PATENT DOCUMENTS

| | | | | | |
|---|---|---|---|---|---|
| 2,877,508 | A | * | 3/1959 | Ewart | 52/270 |
| 2,941,632 | A | * | 6/1960 | Rankin | 52/275 |
| 3,236,014 | A | * | 2/1966 | Edgar | 52/270 |
| 3,277,620 | A | * | 10/1966 | Martin | 52/270 |
| 3,305,986 | A | * | 2/1967 | Mathews | 52/270 |
| 3,387,733 | A | * | 6/1968 | Field | 52/270 |
| 3,517,468 | A | * | 6/1970 | Woods | 52/265 |
| 3,665,662 | A | * | 5/1972 | Timbrook et al. | 52/270 |
| 3,665,668 | A | * | 5/1972 | Maddan, Jr. | 52/275 |
| 3,783,563 | A | * | 1/1974 | Moore | 52/11 |
| 3,992,829 | A | * | 11/1976 | Schellberg et al. | 52/284 |
| 4,057,948 | A | * | 11/1977 | Wise | 52/265 |
| 4,078,348 | A | * | 3/1978 | Rothman | 52/309.7 |
| 4,126,972 | A | * | 11/1978 | Silen | 52/169.6 |
| 4,297,817 | A | * | 11/1981 | Bullock et al. | 52/169.6 |
| 4,628,650 | A | * | 12/1986 | Parker | 52/265 |
| 4,730,428 | A | * | 3/1988 | Head et al. | 52/309.11 |
| 4,776,138 | A | | 10/1988 | Sumner et al. | |
| 4,964,252 | A | * | 10/1990 | Guliker | 52/275 |
| 5,210,984 | A | * | 5/1993 | Eckel | 52/265 |
| 5,305,568 | A | * | 4/1994 | Beckerman | 52/309.4 |
| 5,979,684 | A | * | 11/1999 | Ohnishi et al. | 220/1.5 |
| 6,041,562 | A | * | 3/2000 | Martella et al. | 52/265 |

* cited by examiner

Primary Examiner—Michael Safavi
(74) Attorney, Agent, or Firm—Banner & Witcoff Ltd.

(57) ABSTRACT

A buried vault enclosure of fiber reinforced plastic, wherein earth material, such as dirt, sand, and rocks, substantially covers the entire enclosure. The vault enclosure includes a plurality of prefabricated panels formed from pultruded members having a plastic reinforced composition. The prefabricated panels, includes a plurality of bonded vertical panels, a floor panel attached to a lower end of the vertical panels; and a ceiling panel attached to an upper end of the vertical panels. The pultruded panels for constructing the vault enclosure include an outer planar sheet, an inner planar sheet and a plurality of support members that are spaced from each other. The support members are bonded or integrally connected between the inner sheet and the outer sheet so that the inner and outer sheets sandwich the support members. Each support member preferably includes opposing substantially planar surfaces for supporting the inner and outer sheets and a web member between the planner surface. A method of making a vault enclosure includes pultruding a plurality of panel members, including sheets, support members and angles members. Another step includes assembling or connecting the panel members together to form a plurality of panels for constructing the enclosure. The method further includes forming the enclosure by bonding the panels together with an adhesive or an adhesive system.

12 Claims, 17 Drawing Sheets

PULTRUDED FIBERGLASS REINFORCED PLASTIC UNDERGROUND VAULT CONSTRUCTION

CROSS REFERENCE TO RELATED APPLICATIONS

This application claims the benefit of U.S. Provisional Application Ser. No. 60/167,957, filed Nov. 29, 1999.

FIELD OF INVENTION

The present invention relates to underground or buried enclosure structures, in particular to, a buried vault constructed of pultruded fiberglass reinforced plastic.

BACKGROUND OF THE INVENTION

Underground vaults have been used for storing and/or housing various items or equipment. One such use is for the housing of electrical and optical elements of communication systems. Such an application is described in U.S. Pat. No. 4,776,138, and is incorporated by reference herein.

Most commonly, vaults for this purpose are made by concrete walls and floors. In the past, construction of underground vaults has been performed by either casting the floors and walls in-place with concrete or by prefabricating the concrete elements and assembling them beneath the ground. However, neither of these approaches has been totally satisfactory. A concrete cast-in-place structure has been manufactured something in the form similar to that of a storm shelter. The ordinary construction has been a skeleton of reinforcing bars or wire mesh inside of concrete walls. Cast-in-place concrete vaults can be undesirable because of the amount of time and man-hours it takes to install due to their size, amount of concrete required, and concrete setting requirements. A typical cast-in-place concrete vault has internal dimensions upwards of 32' length by perhaps 10' width and a ceiling height of 9'. The wall thickness is relatively thick to assure a substantial structure, the gross weight is approximately 90 tons or more. Handling and transporting a 90 ton structure is somewhat difficult. Often, such concrete vaults have been fabricated in sections for easier transport. Concrete vaults, however, made from prefabricated sections and assembled below ground can be undesirable because the wall thickness of such panels must be relatively thick to ensure a substantial structure. Thus, the concrete panels are typically very heavy and the handling and transporting of the panels of such weight can be burdensome. The joints of assembled in place concrete vaults are leak prone due to ground water hydrostatic pressure. Also, this approach requires that the equipment that is housed in the concrete vault be integrated on the work site during the assembly process. This causes the equipment to be exposed to the outdoor environment. Long on site assembly time is undesirable due to lost operational time of the house equipment. Particularly, when telecommunication equipment is used to provide commercial services, delays in making the equipment operational reduces the revenues and increases overhead costs for the service provider.

U.S. Pat. No. 4,776,138 to Simmer et al. discloses a vault made primarily from fiberglass. However, this vault design also has drawbacks. For example, such a vault requires a different mold design for each vault which makes customization expensive and impractical. Further, fabrication may be difficult or time consuming in that the sheets must be individually wrapped around the mold. This assembly is then covered with a balsa-wood or foam. After that step, additional fiberglass is applied.

SUMMARY OF THE INVENTION

The present invention is directed to a vault enclosure for buried use constructed of pultruded fiber reinforced plastic that overcomes the problems in the prior art.

One aspect of the present invention includes a vault enclosure for subterranean use having a plurality of prefabricated panels formed from pultruded members having a plastic reinforced composition. The vault enclosure includes a plurality of bonded vertical panels, a floor panel attached to a lower end of the vertical panels, and a ceiling panel attached to an upper end of the vertical panels. The panels include planar sheets attached to opposite sides of a plurality of spaced support members disposed between the sheets.

A second aspect of the present invention includes a pultruded panel for constructing a buried vault. The panel comprises an outer planar sheet and an inner planar sheet. A plurality of support members that are spaced from each other are bonded or integrally connected between the inner sheet and the outer sheet so as the sandwich the support members. Each support member includes at least a web. The web includes opposing substantially planar surfaces for supporting the inner and outer sheets.

A third aspect of the present invention includes a method of making an enclosure for underground use. The method comprises the step of pultruding a plurality of panel members, including sheets, support members and angles members. Another step includes assembling or connecting the panel members together to form a plurality of panels for constructing the enclosure. The method further includes a step of forming the enclosure by bonding the panels together with an adhesive or an adhesive system.

Further objects, features and other aspects of this invention will be understood from the following detailed description of the preferred embodiments of this invention with reference to the attached drawing figures.

DETAILED DESCRIPTION OF THE INVENTION

Figure 1:
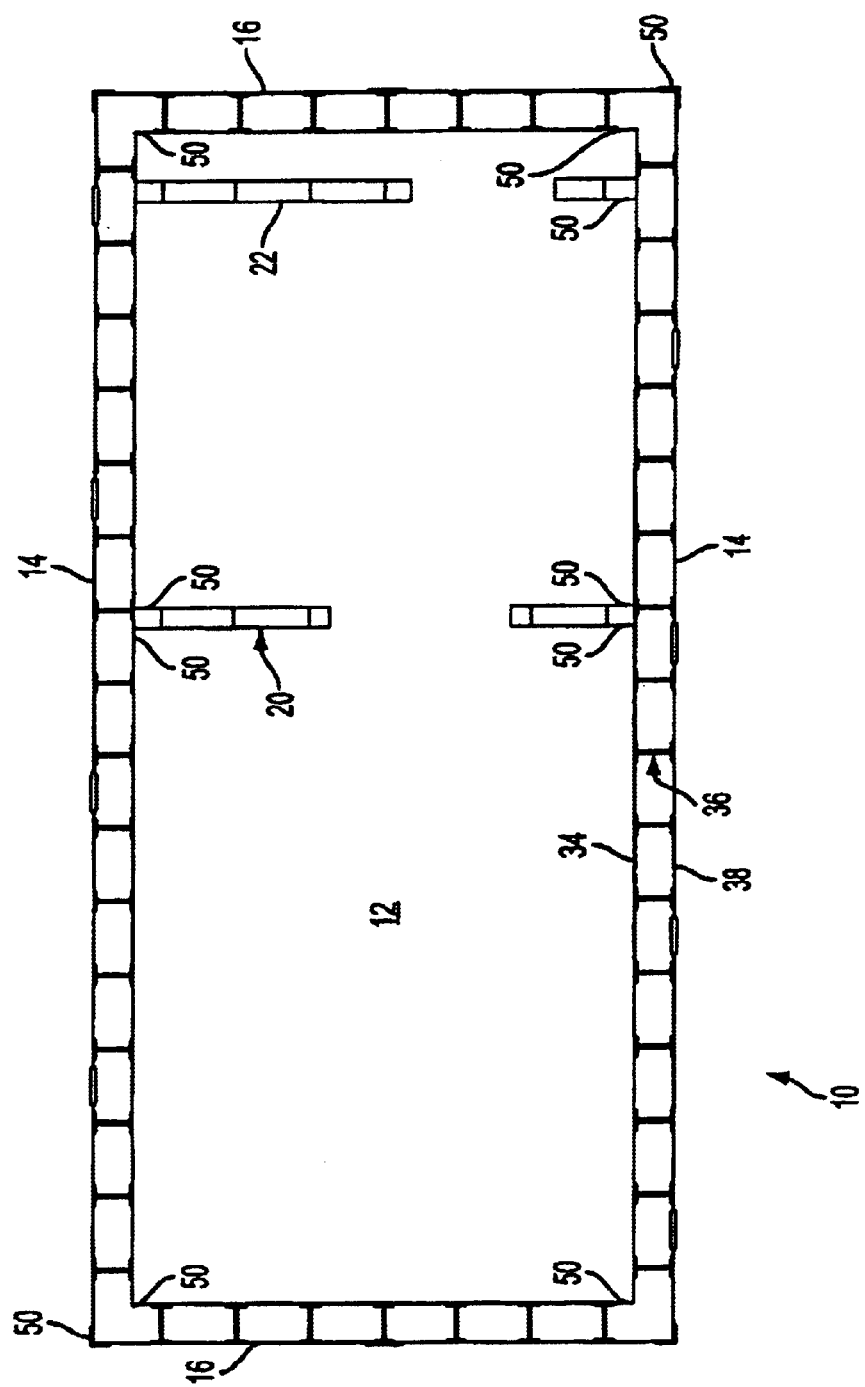
FIG. 1 is a top plan view of an exemplary embodiment of a vault with a ceiling panel removed to show the internal structure of the vault.
Figure 2:
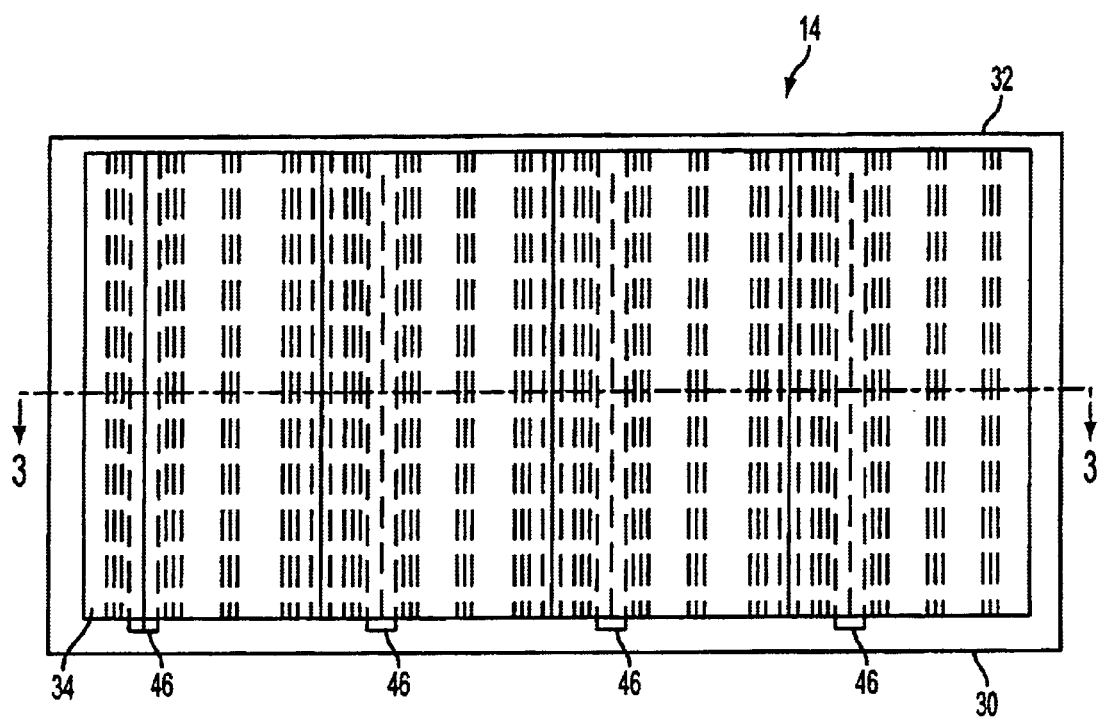
FIG. 2 is a side elevational view of an exemplary embodiment of a longitudinal wall panel with broken lines showing internal support members and connectors on the opposite of the wall panel.

Referring to FIGS. 1–29, an enclosure structure of fiber reinforced plastic, in accordance with the present invention is illustrated. The enclosure structure is preferably used in a buried or subterranean environment wherein earth material, such as dirt, sand, and rocks, substantially covers the entire structure. The enclosure structure is herein referred to as a vault, and designated as reference numeral 10 (in FIGS. 1–13) and numeral 200 (in FIGS. 14–29).

As used herein throughout the specification, reference to a pultruded component designates the component is created by a process of pultrusion. Pultrusion is a method of manufacturing reinforced plastic shapes that includes continuously pulling resin rich reinforcements through a heated steel die to form profiles of constant cross section of continuous length. Pultrusion has not been used for constructing for vault components and panels as described in the exemplary embodiments of the present invention.

Referring to the figures, vault 10 or 200 of the present invention, comprises a plurality of prefabricated panels that are constructed from pultruded elements made of a fiber resinous composite matrix. The prefabricated panels comprise a plurality of interconnecting vertical wall panels or wall units preferably including at least two types-opposing longitudinal wall panels 14 or 214, and opposing lateral wall panels 16 or 216. Vault 10 or 200 further comprises other vertical panels, such as bulkhead wall panels 20 and 22 that may be used as desired to configure and/or subdivide vault 10 or 200 for its intended use. The vault further comprises two types of horizontal panel assemblies—a bottom panel or floor 12 or 212 and a top panel or ceiling 18 or 218 (as shown in FIGS. 5 and 6 or 23 and 25). In one embodiment, when the vault is assembled, floor 12 or 212 attaches to the lower end 30 of the vertical panels and ceiling 18 or 218 attaches to the upper end 32 of the vertical panels. The length of each panel 12–22 is generally longer in a longitudinal direction than the width. The width of the panels travels in a lateral direction perpendicular to the longitudinal direction. It is recognized that the lateral and longitudinal wall panels could have the same length, such as in a square vault. In the present invention, each panel 12–22 has opposing ends in the longitudinal direction for connecting to adjacent panels or other purposes.

Figure 3:
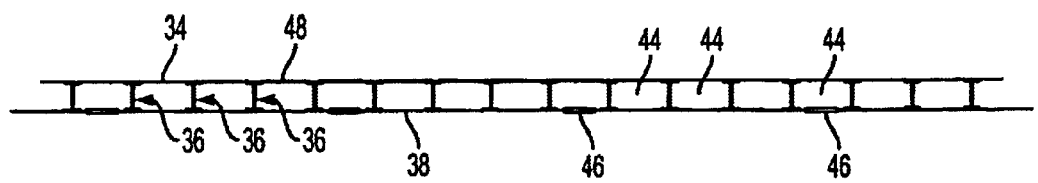
FIG. 3 is a sectional view of the wall panel shown in FIG.2 taken along line 3—3 to illustrate spaced support members within the wall panel.
Figure 4:
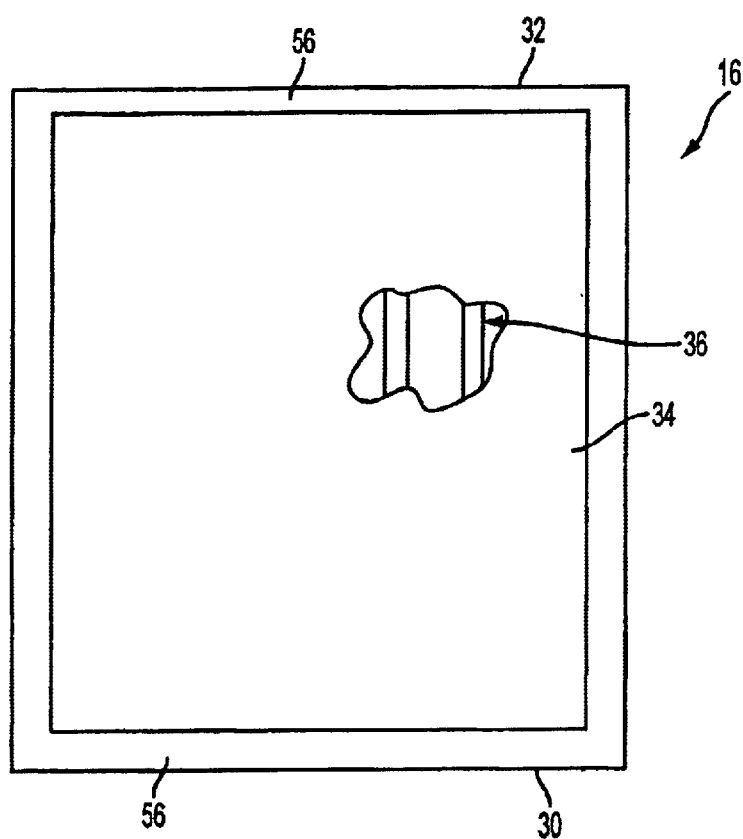
FIG. 4 is a side elevational view of an exemplary embodiment of a lateral wall panel.
Figure 7:
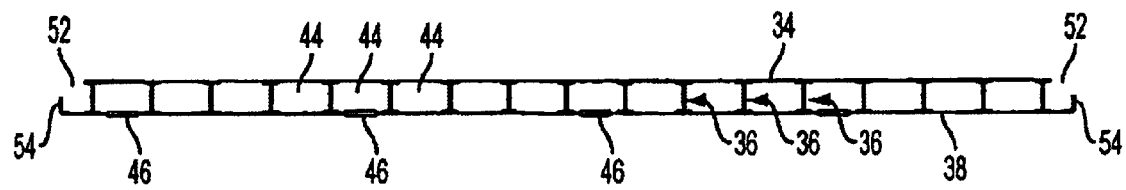
FIG. 7 is a sectional view of the floor shown in FIG. 6 taken along line 7—7.
Figure 13:
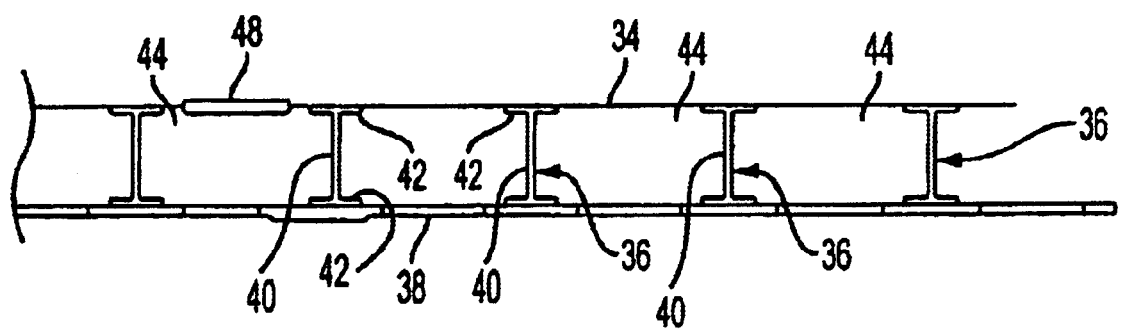
FIG. 13 is a partial cross-section view of a wall panel showing support members connected to adjacent panels.

Each pultruded panel 12–22 in vault 10 is preferably constructed from at least three components—a pultruded inner sheet 34, a plurality of pultruded support members 36, and a pultruded outer sheet 38. Support members 36, (which may be I-beam shaped in cross section) are spaced within the interior cavity of each panel 12–22 according to the desired strength of the completed vault assembly. Referring to FIGS. 3, 7, and 13, in the "I" beam embodiment, each support members includes a web member 40 disposed between opposing flanges 42. Flanges 42 are preferably arranged substantially parallel with respect to each other and perpendicular to the web member 40. These flanges form opposing mounting or attaching surfaces for the sheets. The pultruded support members in the "I" beam embodiment have excellent mechanical load carrying capacity per weight of the beams. This provides for a reduced weight of the panels. In an alternative embodiment of the support members, any pultruded shape can be employed that effectively carries the bearing load from the earth material on the vertical wall panels, ceiling, such as a "C" or "U" channel shape, or a box beam shape. In addition, these other pultruded shapes can be used in floor 12. These other shapes will have attaching surfaces for bonding or being integrally formed to the pultruded inner and outer sheets of the present invention.

FIG. 13 illustrates a partial sectional of the panels. To form the panels, inner sheet 34 having a substantially planar arrangement is bonded to one side of support members 36. Similarly as the inner sheet, outer sheet 38 is bonded to the other side or opposing side of the I-beam shaped support members so as to "sandwich" support members 36. This creates a hollow panel with the exception of the support members. In addition, the panel includes a plurality of interstitial pockets 44 interposed between the support members. While not necessary, insulation may be added into these pockets. The sheets and support members 36 may be bonded together using any desirable adhesive or adhesive system, such as an epoxy, methacrylate, urethane, or any other known suitable adhesive system.

In an alternative embodiment, the entire panel, or sections thereof, may be pultruded in a unitary manner having a cross-sections similar to that as shown in the FIGS. 1, 3, 7, 13, 16, 20, 24, and/or 27. In this unitary panel embodiment of the present invention, the inner and outer sheets of each panel are integrally formed with the support members. In this way, the panels have greater uniform strength and increased manufacturing efficiencies can be realized by reduction in labor to assemble the panel components. Further, additional cost savings can result from using less material.

In the design of each vault, the size of the I-beam support members, the thickness of the inner sheet 34 and outer sheet 38 and the fiber reinforced properties are optimized to the strength requirements of the vault, which are based on the overall size of the finished vault structure. The load that the wall panels must carry when buried underground will increase as the area of that individual wall panel is increased, therefore the structural members resisting those forces must have higher mechanical and structural capabilities to match.

Depending on the specific requirements of the vault, panels 12–22 may be comprised of a number of shorter units that individually do not extend the entire longitudinal length of the panels. In an arrangement of shorter units, the ends of the abutting panel units are joined together by a connector 46, such as a strip of fiberglass adhered to the ends. This also seals the inside of vault 10 from the exterior of the vault, including earth material and water. In a preferred arrangement, the abutting end of panel sections of inner and outer sheets 34, 38 may be offset, such as shown in the FIGS. 3, 7, and 13 to provide additional structural stability. In another arrangement, "H"-shaped connectors 48 are interposed between ends of the adjacent panels such that ends of the inner and outer sheets are received and bonded or adhered to the connectors.

All vertical panels 14, 16, 20, 22, floor 12, and ceiling 18 are preferably assembled as individual units prior to being bonded together into the final enclosed vault structure. The panels can be bonded together off site to make an assembled enclosed vault structure that is transported to the work site. Prior to transporting the vault structure to the work site, various equipment and supporting hardware may be integrated into the enclosed vault structure. If desired, the panels can be transported via a truck to a work site where the enclosed vault structure can be assembled. Support members 36 inside of the floor and the top or ceiling panel 18 are oriented perpendicular to the longitudinal side of the vault assembly. Pultruded 90° angle members 50 are used as the framework of each vertical panel to provide a bonding surface for the adjoining wall, floor, and ceiling panels to be secured to along both the interior and exterior panel edges.

Figure 5:
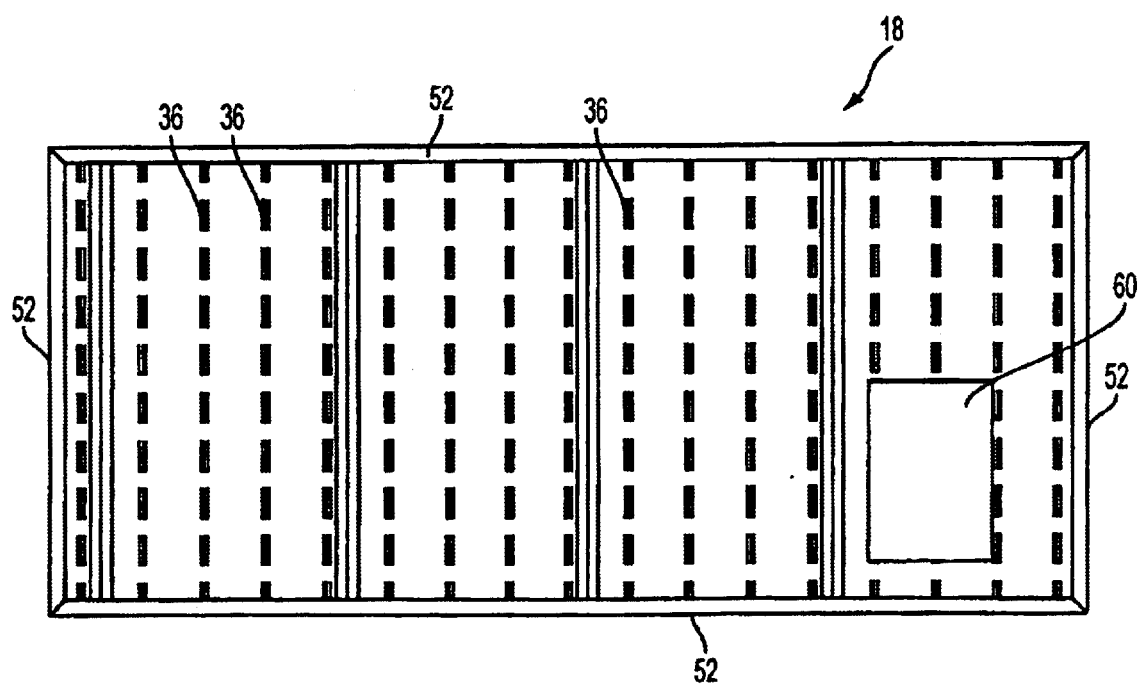
FIG. 5 is a top plan view of an exemplary embodiment of a ceiling panel with broken lines showing support members inside of the panel.
Figure 6:
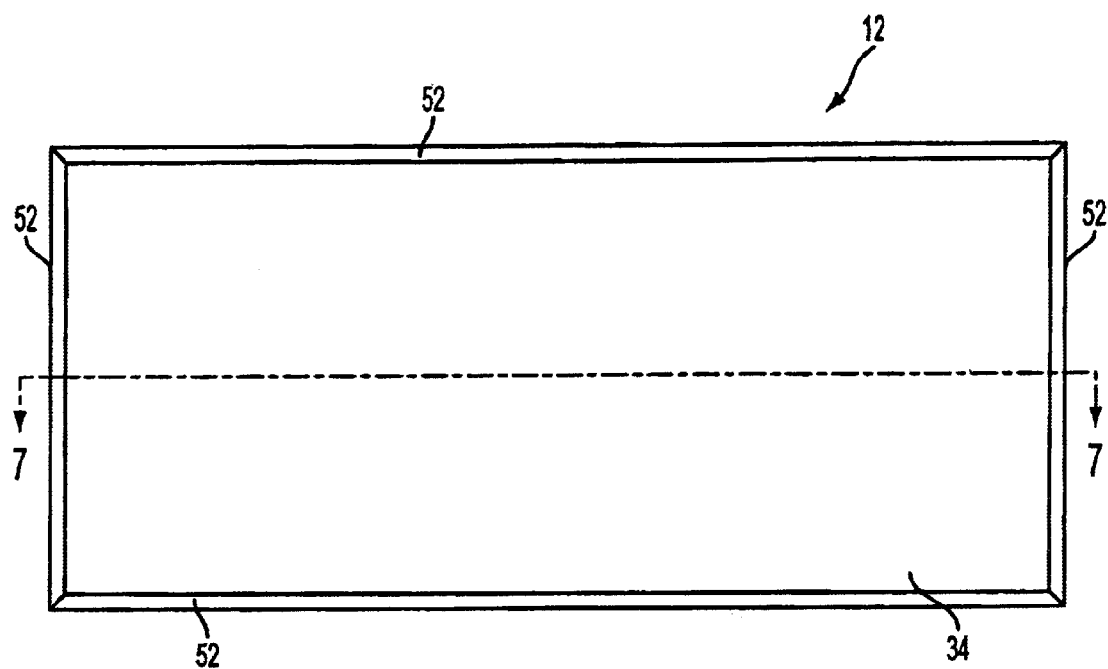
FIG. 6 is a top plan view of an exemplary embodiment of a floor.
Figure 11:
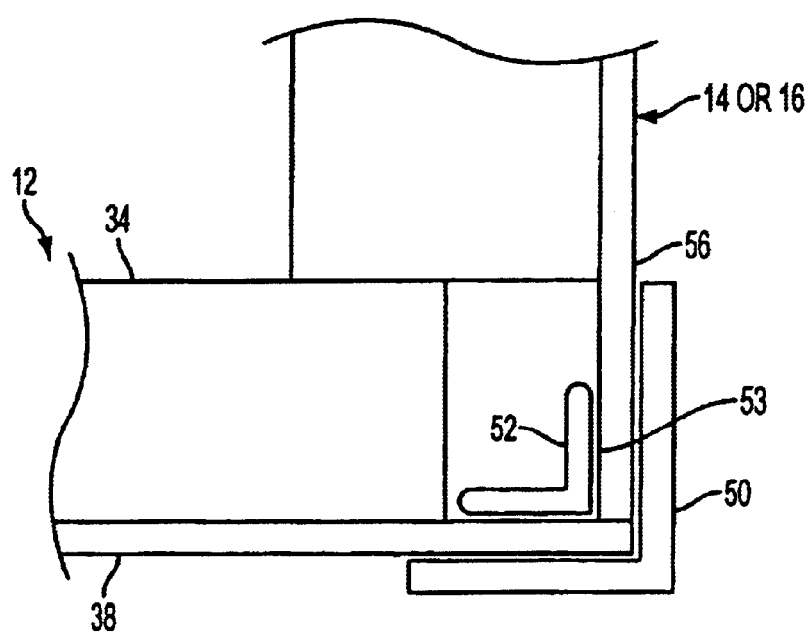
FIG. 11 is a partial side view of an interconnection between the floor and wall panels of the present invention.
Figure 12:
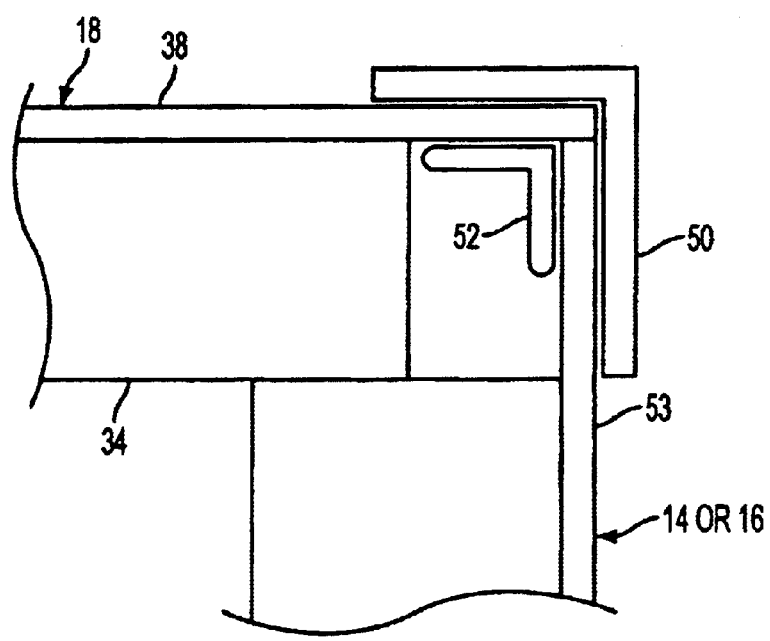
FIG. 12 is a partial side view of a second interconnection between the ceiling panel and wall panels of the present invention.

The assembly of vault 10 will now be described. FIG. 11 illustrates an interconnection of floor 12 and the lower end of wall panels 14, 16 of the present invention. Similarly, FIG. 12 illustrates the interconnection between ceiling 18 and the upper end of the wall panels 14, 16. Referring to FIGS. 5 and 6, the periphery of ceiling 18 and floor 12 include an extension member 52 providing a bonding and aligning surface for the longitudinal and lateral walls panels 14, and 16. As best shown in FIGS. 11 and 12, extension member 52 extends from the outer sheet and towards the inner sheet. The outer surface 53 of the extension member forms a bonding surface for the upper or lower end of panels 14, 16. The extension member operates to secure and seal panels 14, 16 to the ceiling or floor. This extension member can be embodied in pultruded angles oriented in the direction shown in FIG. 7. A bonding member 56 is shown in FIGS. 2, 4, 11, 12, wherein panels 14, 16 include the bonding member extending the length of upper end 30 and lower end 32. When the panels are mounted to floor 12 and ceiling 18, bonding member 56 and extension member 52 mate to form an overlapping joint or lap joint arrangement. This arrangement advantageously provides a strong bonding structure. The interconnection structure with the pultruded members also provides for a structurally flexible connection. Adhesives, as previously described, may be used for strength and sealing purposes as desired.

Referring to FIGS. 1–13, support members 36 in each vertical panel 14, 16, 20, 22 are arranged vertically similar to wall studs in other building structures. The vertical panels are assembled to the floor in which the support members are set upon a top surface of the inside of the floor for transferring vertical loads onto the floor assembly. In turn, the ceiling of the vault structure is set on top of the same vertically oriented support member 36, after all of the walls are in place, transferring load from the top of the vault structure into walls 14, 16 in a compressive nature. When all walls 14, 16, floor 12, and ceiling 18 panels are fully assembled and bonded into place, additional pultruded angles 50 are bonded into all interior and exterior 90° corners for additional reinforcement and durability of the adhesive bonds, between the adjoining wall panels, floor and ceiling junctures. These additional angles also provide a finished "trimmed" internal appearance to the vault structure (see FIG. 29). The angles are attached to the wall panels by any desirable adhesive or adhesive system, such as those previously described.

Figure 8:
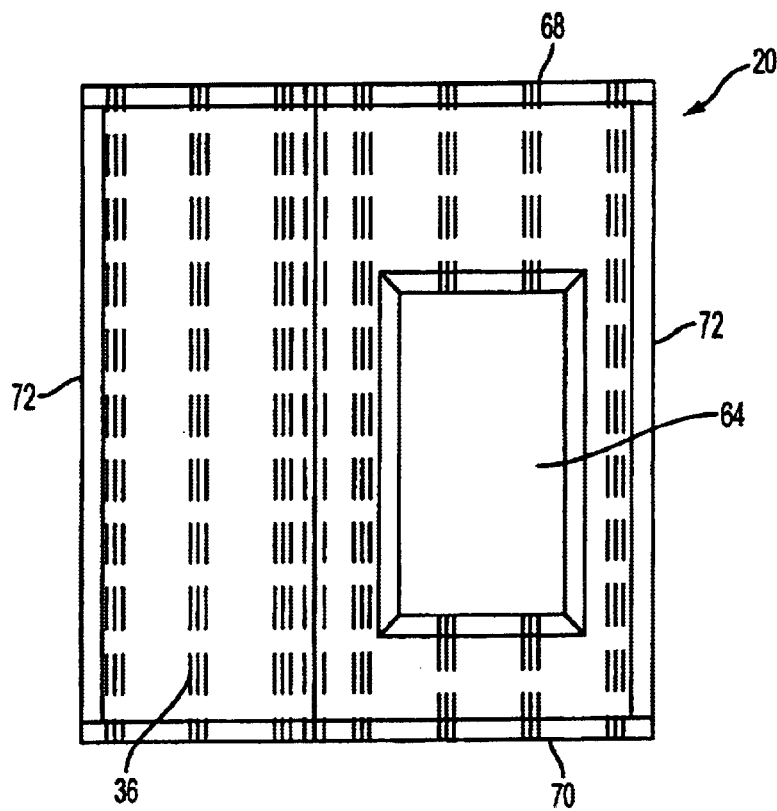
FIG. 8 is a side elevational view of an exemplary embodiment of a bulkhead panel with broken lines showing support members inside of the panel.
Figure 9:
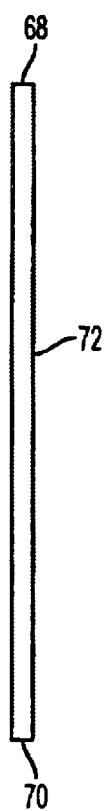
FIG. 9 is a side elevational view of the bulkhead panel shown in FIG. 8.
Figure 10:
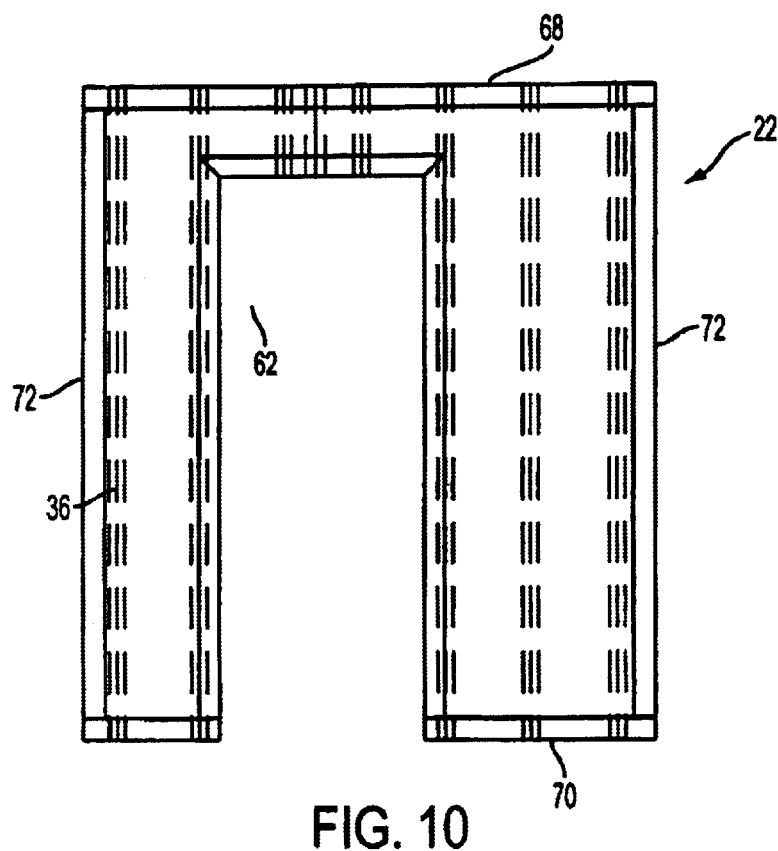
FIG. 10 is a side elevational view of a second exemplary embodiment of a bulkhead panel with broken lines showing support members inside of the panel.

Referring to FIGS. 8–10, bulkhead panels 20, 22 have a mounting arrangement wherein the top edge 68, bottom edge 70, and side edges 72 of the panels are substantially flat. This provides for placement of panels 20, 22 generally as desired in the interior of vault 10. FIG. 1 shows an assembled arrangement of panels 20, 22, wherein, top edge 68 will bond to ceiling 18; bottom edge 70 bonds to floor 12; and side edges 72 bonds to longitudinal wall panels 14. If desired, when bulkhead panels 20, 22 are fully assembled and bonded into place, pultruded angle members 50 are bonded into the interior 90° corners where side edges 72 meets wall panels 14, 16 for additional reinforcement and durability of the internal adhesive bonds. These angle members 50 extend between the floor and ceiling of the vault. If desired, the bulkhead panels may be mounted parallel to the longitudinal wall panels 14. In the arrangement, the side edges 72 may bond to lateral wall panels 16. In this way, the bulkhead panel provide greater flexibility of configuring various operating spaces for the different types of equipment and other intended applications.

Figure 25:
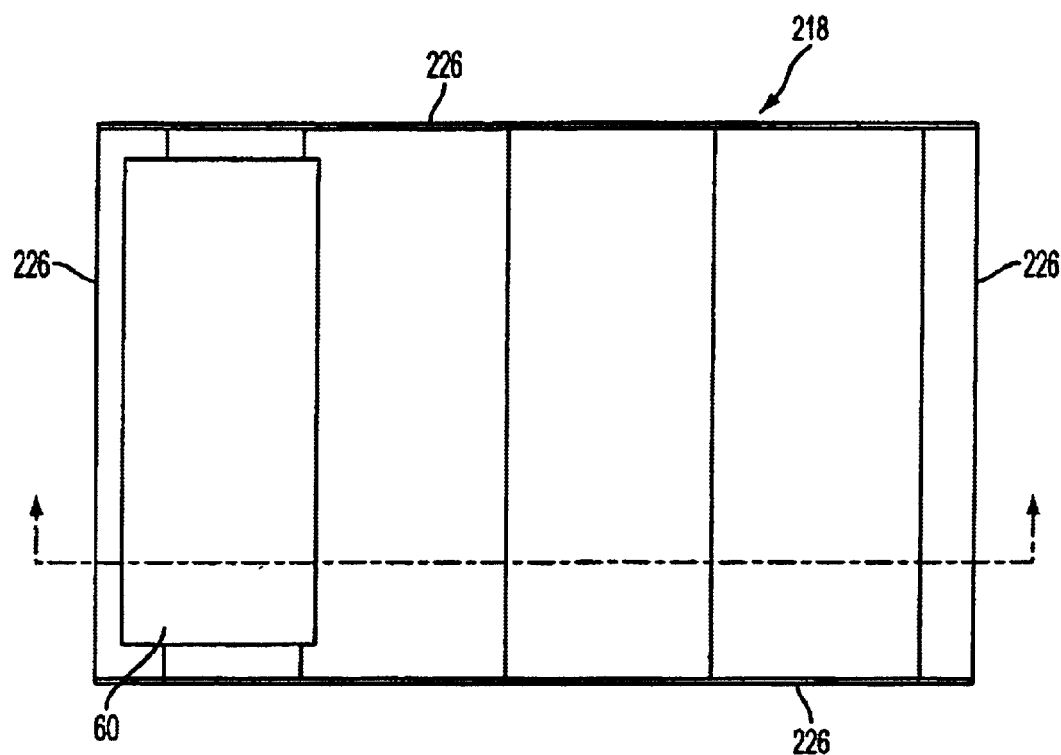
FIG. 25 is a top plan view of a second exemplary embodiment of a ceiling.

Any desired holes, pathways, or apertures may be cut into the panels. These apertures may be for a door hatch 60 (as shown in FIGS. 5 and 25), a bulkhead opening 62, 64 (as shown in FIGS. 8 and 10), or any size opening to receive cable or other items. Various pieces of equipment may be installed or fitted to the finished vault structure to provide ingress and egress access, environmental control, power generation, and the intended telecommunication equipment for each application. These items are used regularly in the telecommunications industry. Other items used with the equipment may be cableways, conduit, electric ducts, and mechanical ductwork. Standard seals between the intended equipment and holes in the exterior panels may be provided.

Figure 14:
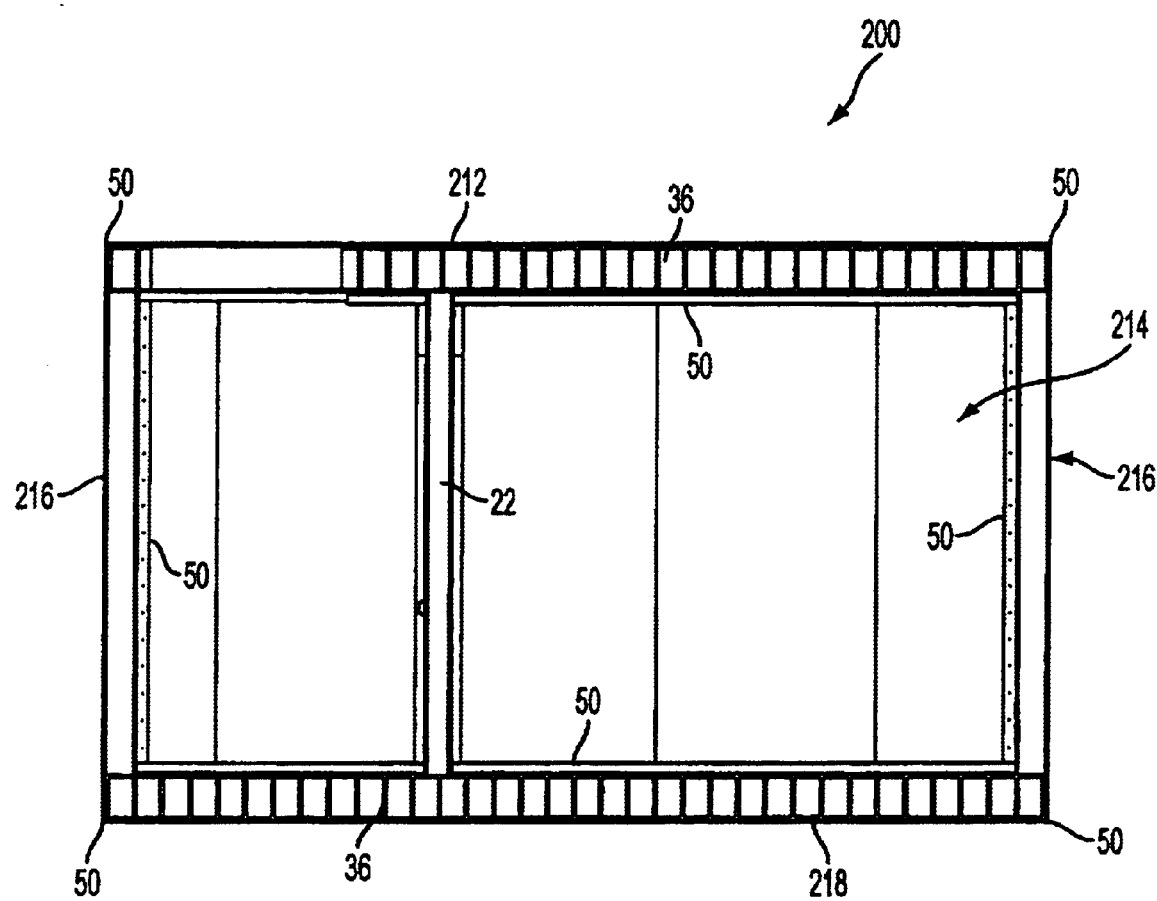
FIG. 14 is a sectional side view of a second exemplary embodiment of a vault showing structure of a ceiling and floor.

FIG. 14 illustrates an alternative preferred embodiment of a vault structure designated as numeral 200. As with vault 10, vault 200 preferably includes a floor panel 212, a ceiling panel 212, opposing longitudinal panels 214 and opposing lateral panels 216. Vault 200 preferably also has at least one bulkhead panel 22 mounted therein. Unless otherwise noted, features and aspects of and related to vault 10 in FIGS. 1–10 may be provided with vault 200.

Figure 15:
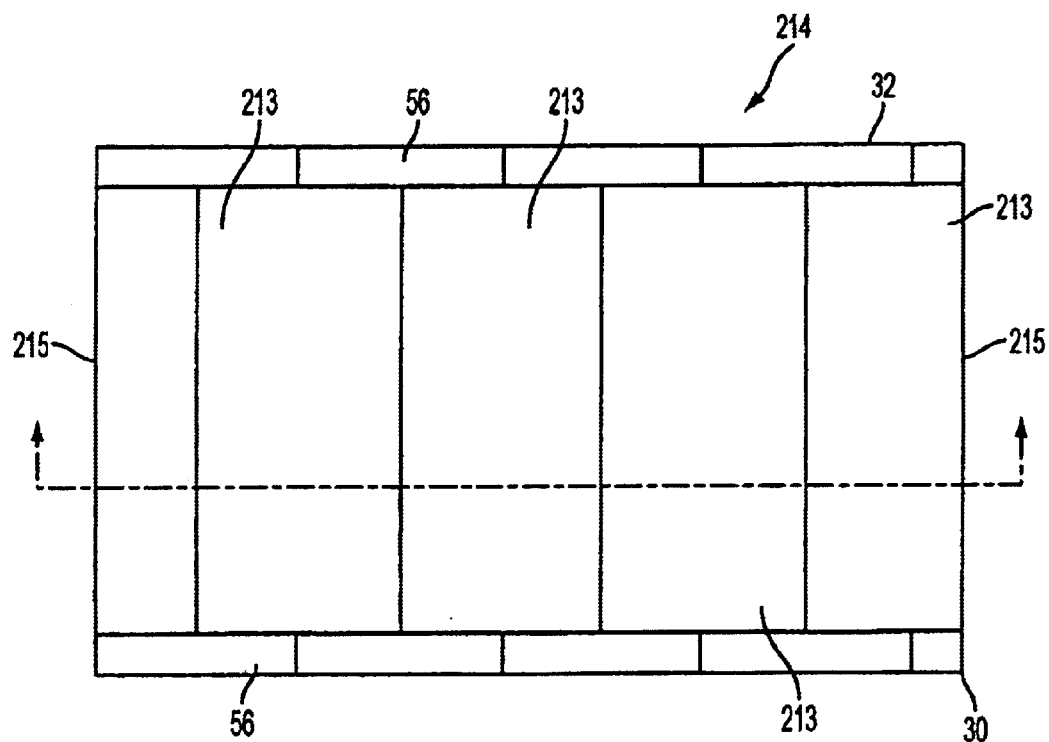
FIG. 15 is a side elevational view of a second exemplary embodiment of a longitudinal wall panel showing panel sections.
Figure 16:
FIG. 16 is a sectional view of the longitudinal wall panel shown in FIG. 15 taken along line 16—16 to illustrate spaced support members within the wall panel.
Figure 17:
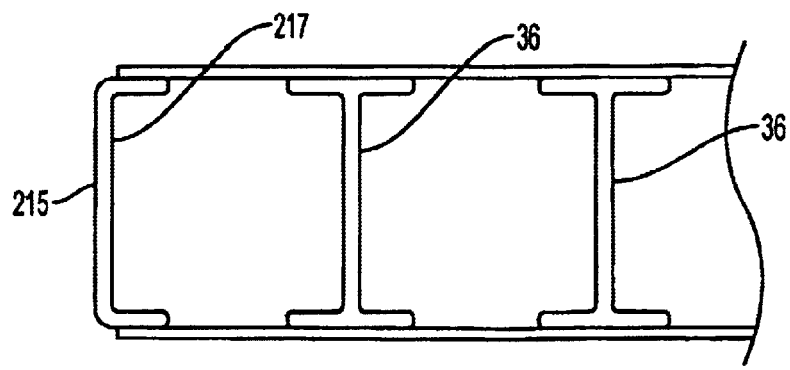
FIG. 17 is an enlarged view of an opposing edge of the wall panel shown in FIG. 15.
Figure 18:
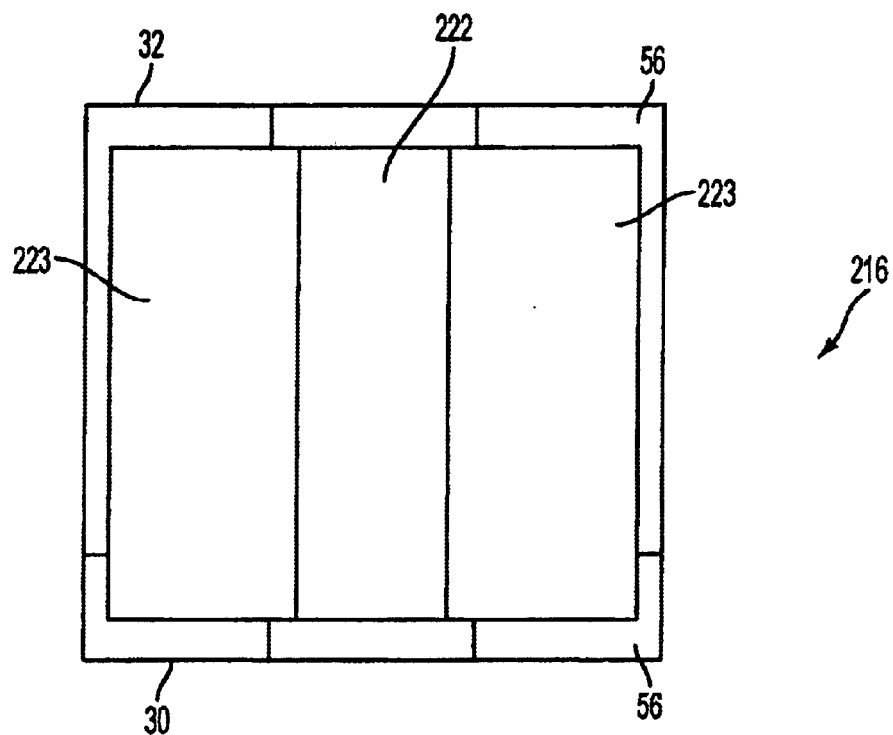
FIG. 18 is a side elevational view of a second exemplary embodiment of a lateral wall panel showing panel sections.
Figure 19:
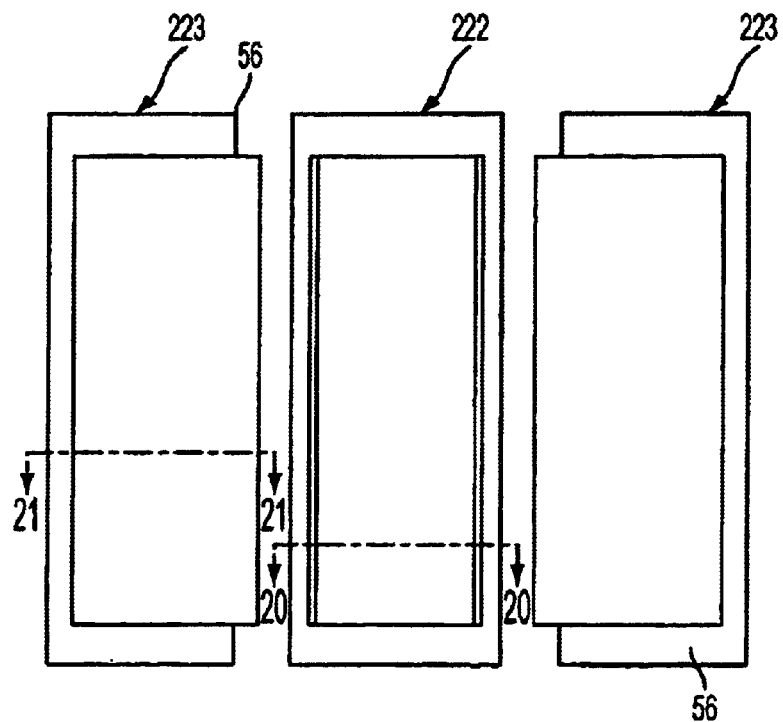
FIG. 19 is an assembly view of the panel sections shown in FIG. 18.

FIGS. 15–17 shows a side elevational view of a longitudinal wall panel 214 with opposing ends for mounting to abutting lateral wall panels. Wall panel 214 is preferably similar to wall panel 14, except that the opposing ends have a flat bonding surface 215 instead of an offset end. As seen in FIGS. 16 and 17, bonding surface 215 can be embodied by an exposed surface of a pultruded "C" channel 217 oriented in an upright direction as shown.

Figure 20:
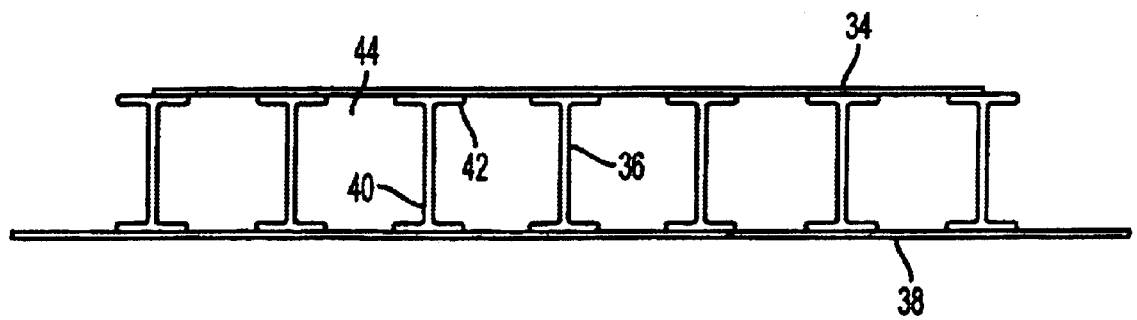
FIG. 20 is a sectional view of a plug wall panel section shown in FIG. 18.
Figure 21:
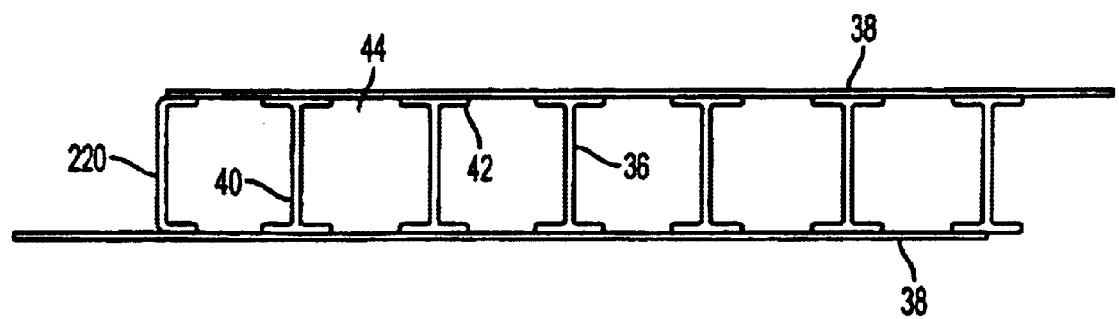
FIG. 21 is a sectional view of a panel section shown in FIG. 18.

FIGS. 18–21 illustrates a second embodiment of a lateral wall 216. Lateral wall 216 is preferably similar to lateral wall panel 16, except that one of the panel sections 223 is configured to be a removable plug wall section 222. FIG. 20 shows a sectional view of plug wall section 222 having extending ends formed of the outer sheet. Plug wall section 222 is selectively removable prior to the vault being installed. After wall panels 214, 216, and 22, ceiling panel 212 and floor panel 218 are assembled, plug wall section 222 can be temporarily installed into the lateral wall. The plug wall section can be removed and equipment to be housed and integrated into the vault can be moved through the opening left by the removed plug wall. The extending ends of plug wall section 222 mount to the adjacent panel sections 223 in a manner as previously described. Plug wall section 222 may be permanently bonded to the adjacent sections 223 of the lateral wall 216 by the previously described adhesives. The abutting ends of panel section 222 and 223 may be sealed by fiber-reinforced tape.

Figure 22:
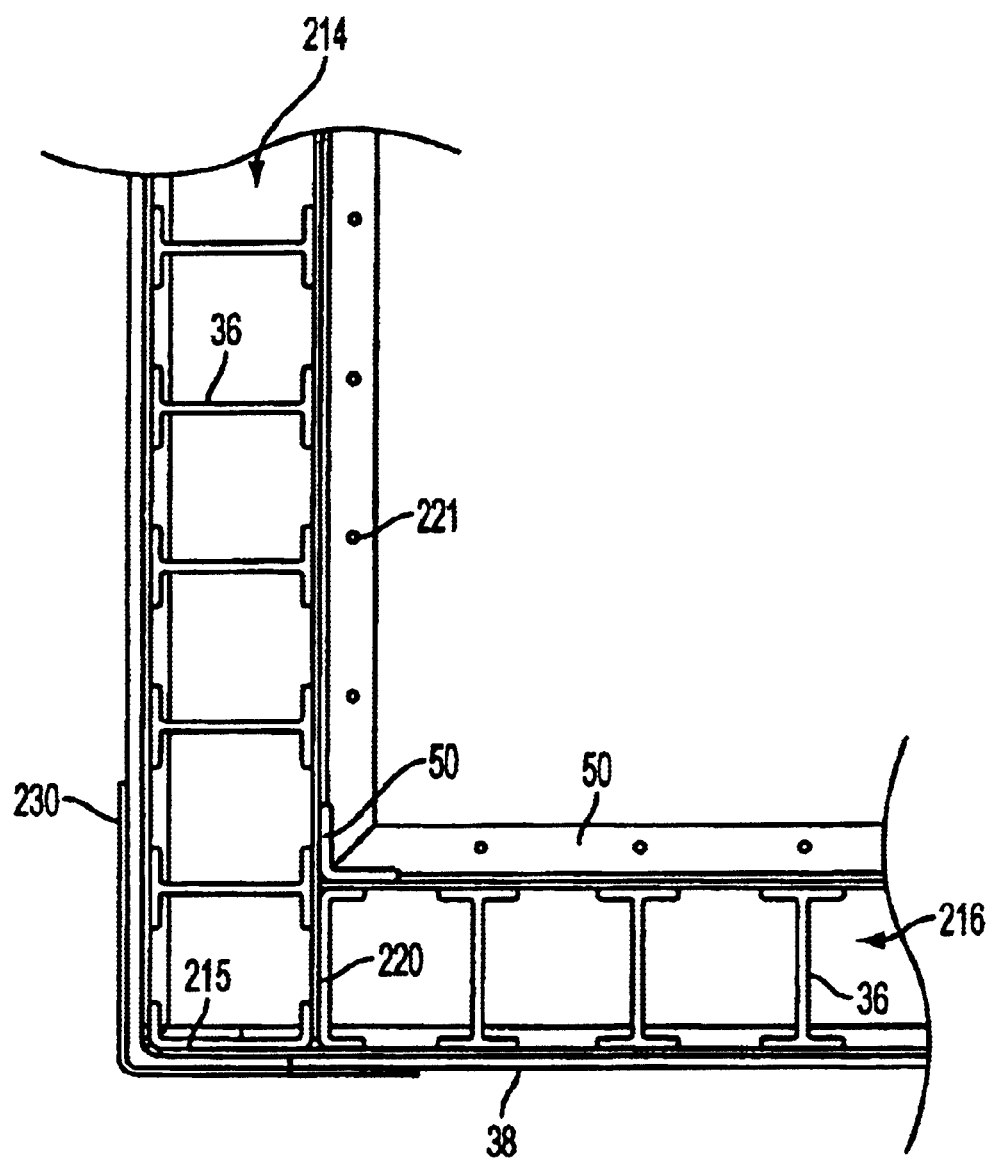
FIG. 22 is a partial top sectional view of an interconnection between a lateral wall and a longitudinal wall.
Figure 23:
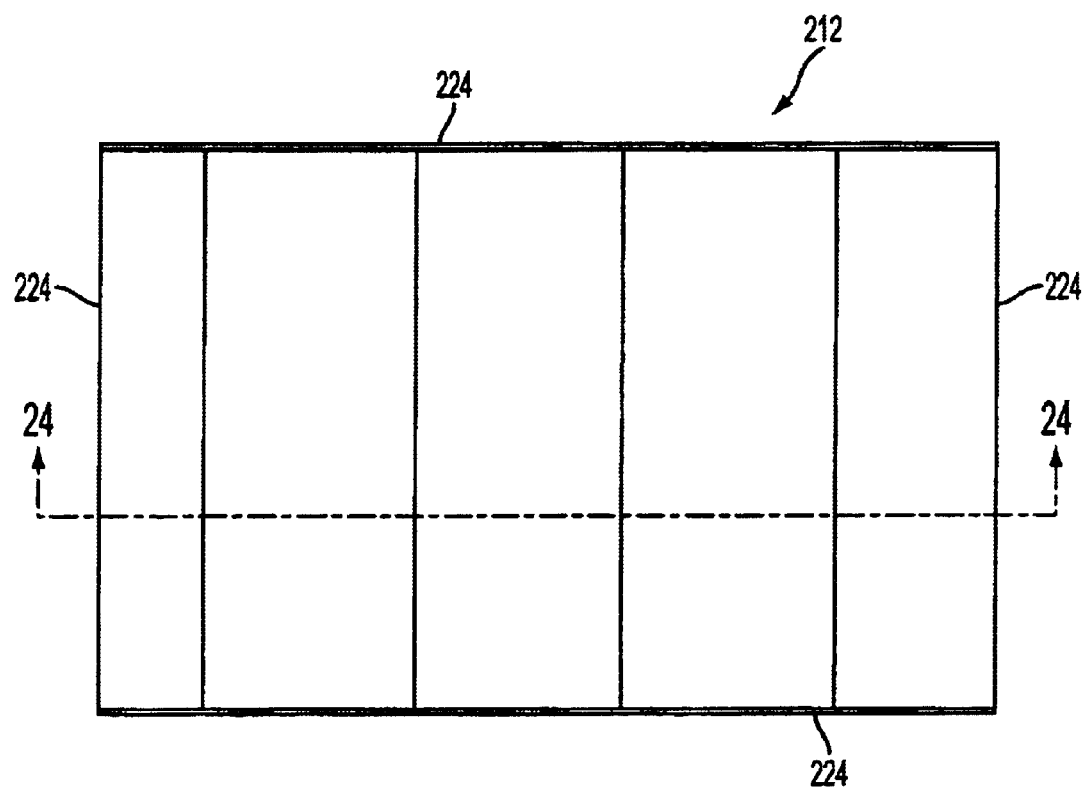
FIG. 23 is a top plan view of a second exemplary embodiment of a floor.

Referring to FIG. 22, the connection between the interface between abutting longitudinal and lateral walls 214 and 216 provides a strong structural connection. The vault structure has a dual bonding and mating arrangement at the interface between abutting walls 214, 216. Bonding surface 215 of wall panel 214 connects to outer sheet 38 of lateral wall panel 216 and the bonding surface 220 of lateral wall panel 216 connects to the inner sheet 34 of longitudinal wall panel 214. This arrangement forms overlapping type of joint. FIG. 22 also illustrates pultruded angles 50 bonded on the interior and exterior interface of the abutting walls. If desired, angles 50 can be additionally secured to floor and ceiling by spaced rivets 221 that provide additional shear strength in the bond.

Figure 24:
FIG. 24 is a sectional view of the floor shown in FIG. 23 taken along line 24—24.
Figure 26:
FIG. 26 is a sectional view of the ceiling shown in FIG. 25 taken along line 26—26.
Figure 27:
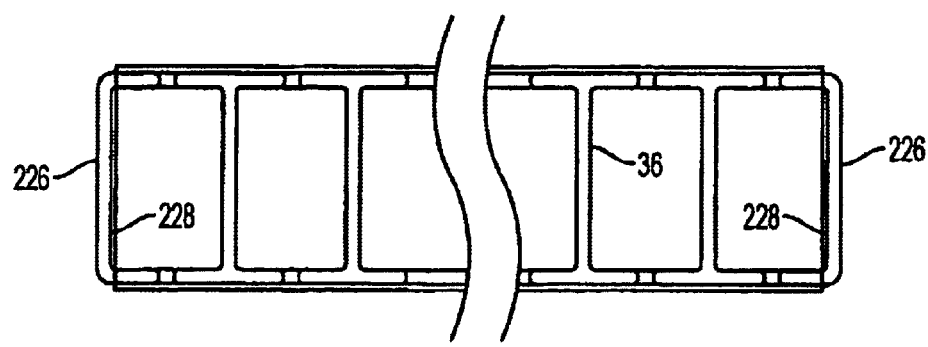
FIG. 27 is an enlarged view of an end of the ceiling shown in FIG. 25.

FIGS. 23–27 illustrates a second embodiment of a floor panel 212 and ceiling panel 218 of the vault structure. Each of the floor panel 212 and the ceiling panel 218 includes a bonding face 224, 226 on their ends instead of providing extension member 56 as in floor 12 and ceiling 18. As shown in FIGS. 24, 26, and 27, bonding face 224, 226 can be embodied by an exposed surface of a pultruded channel 228. The bonding face of the floor and ceiling abuts the bonding member of the walls 214, 216. This also forms an overlapping joint arrangement.

Figure 28:
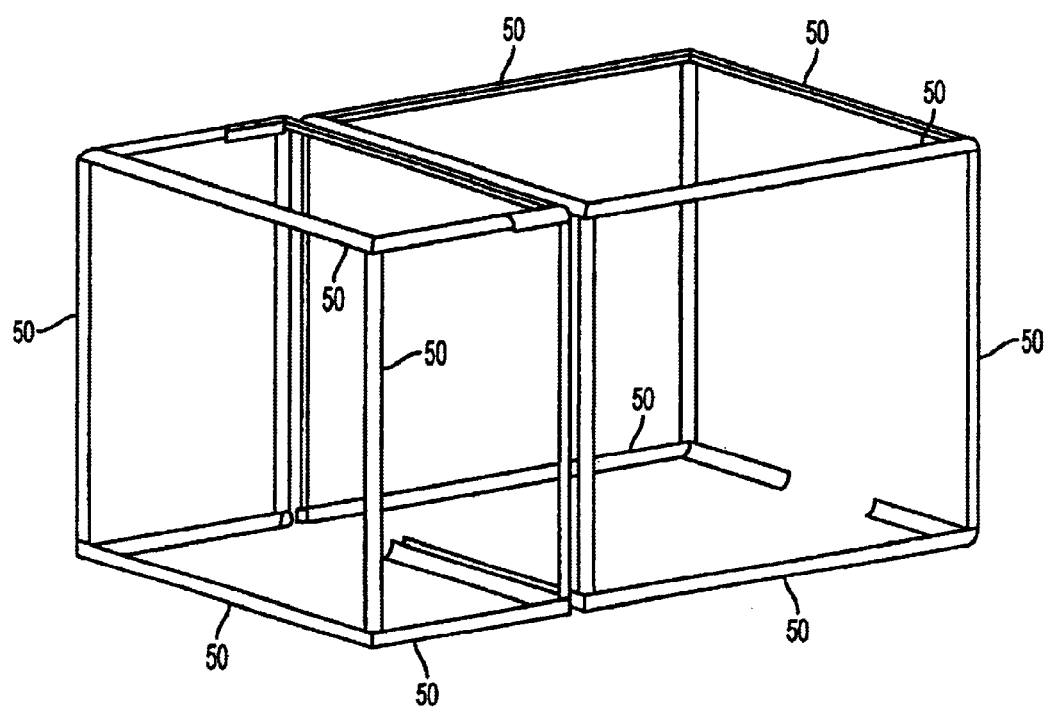
FIG. 28 is a perspective view of an embodiment of a framework of angles.

FIG. 28 illustrates an embodiment of framework of the interior pultruded angles 50. It should be recognized the vertical, floor, ceiling and bulkhead panels have been removed to show the arrangement of the angles.

Figure 29:
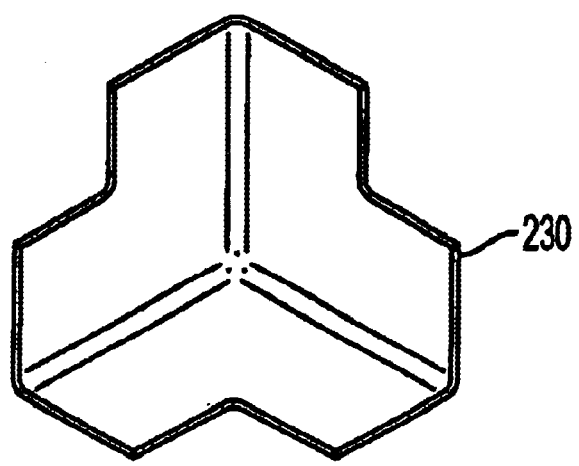
FIG. 29 is a perspective view of an embodiment of a corner cap.

If desired, the corners at the intersection of the floor, longitudinal, and lateral walls can be fitting with a corner cap 230 shown in FIG. 29. Additionally, corner cap 230 is installed at the corners of the intersection of the ceiling, longitudinal, and lateral walls. This corner cap provides for a "trimmed" external appearance as well as protecting the corners of the vault from damage. The corner cap advantageously assists in transferring the bearing load from the earth material to the walls. Additionally, corner cap 230 may be provided at the internal corners and adapted to mate with angles 50 to provide internal stability. The corner cap can be fastened by previously described adhesives and adhesive systems. If desired, the corner cap may be fastened mechanically by the rivets.

The manufacturing process of pultrusion will now be described. By employing pultrusion, excellent mechanical characteristics can be obtained in the finished shape of the panel, and panel members. A significant advantage of using the pultrusion process is the cost saving that can be obtained over prior art vault designs. For example, savings can be obtained by having reduced amount of time and man-hours to install due to lower weight of the panels and less material employed in the panels.

Figure 30:
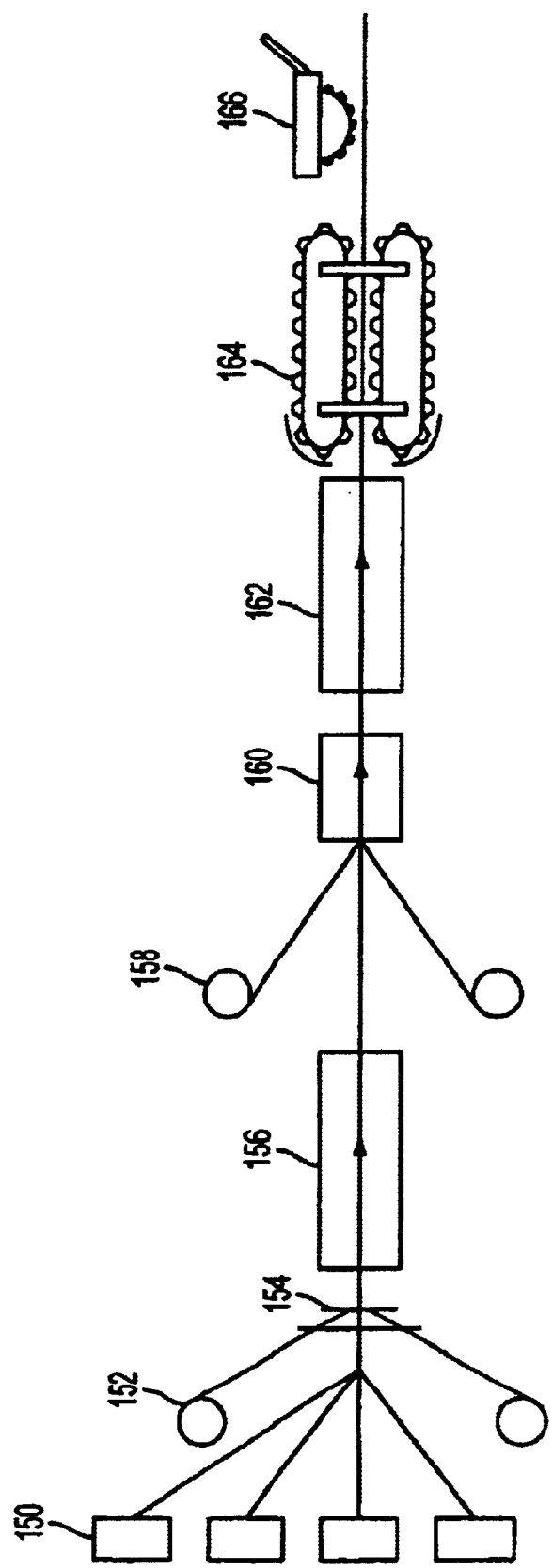
FIG. 30 is a schematic diagram of a pultrusion manufacturing process used in the present invention.

A schematic representation of the pultrusion process is illustrated in FIG. 30. Typically, unidirectional glass roving 150 begins the process. This is the fiber that runs along the length of the profile. Roving 150 is made up of fiberglass unidirectional filaments, which are manufactured in continuous rolls. A significant advantage is the exceptional strength-to-weight ratio that can be obtained by the pultrusion. For example, roving in pultruded products typically comprises 60%–70% of the total glass content. This increased strength-to-weight ratio of current invention also permits the present invention to have longer wall sections with less weight than concrete type vault.

In addition to supplying the necessary strength to pull the profile, roving provides the product with high tensile, flexural properties and is a big contributor to the overall section stiffness. Generally, fiberglass roving is used in pultrusion to achieve the required properties. As an alternative to fiberglass, graphite roving can be used where more stiffness is desired, and polyester roving may be used where more flex is desired. Custom reinforcements can be included which will increase desired properties further over that of the standard pultrusion construction.

One or more fiberglass mats 152 preferably provide the remainder of glass reinforcement used in the pultrusion process, and it typically includes the remaining 30%–40% of the total glass content. The mats 152 are multidirectional reinforcements and are used to obtain the desired transverse properties of the product. Whereas the roving 150 ties the composite together in the longitudinal direction, the mats 152 are responsible for typing the composite together in all directions, but mainly in the transverse direction.

Unlike hand-layed-up or press-molded processes which use short chopped fibers, the pultrusion process includes a multidirectional mat that has good pull strength to facilitate getting it to the die after it has been wet-out with the resin. Continuous strand mat is commercially available for the pultrusion process and offers good wet-out characteristics, conformability to a variety of shapes, and good physical properties including the required pull strength. However, as an alternative to continuous strand mats, it may be desirable to use woven roving, stitched roving, and woven fabrics to increase the desired transverse properties.

The individual strands and mats are routed from their respective supplies, through a guiding device 154, and into and through a liquid resin bath 156. This thoroughly saturates or "wets-out" every fiber with a thermoset resin. When the product is complete, the product will preferably comprise, by weight, at least 40% fiberglass by weight with the remainder being a resin mixture. In another arrangement, the product will contain between 40–50% fiberglass by weight or even greater than 50% fiberglass by weight. Generally, two types of resins are most often used in the pultrusion process. They are polyester resin and vinyl ester resin. In the preferred arrangement, the resins used are of an isophthalic polyester type which are thermosetting resins.

Once cured, they cannot be re-melted or reformed. They are very dimensionally stable and the mechanical properties are not affected greatly by changes in temperature until high temperatures which cause breakdown of the resin are reached.

It is recognized that while the fibers of the strands and mats are described as being preferably fiberglass, other types of fibers for the strands and mats may be used in addition to or in lieu of glass fibers. For example, kelvar, aramid, and carbon/glass fiber material may be used to provide the desired mechanical properties, such as strength, modulus, and stiffness. In such as arrangement, the product may still preferably comprise, by weight, at least 40% fiber material by weight with the remainder being a resin mixture. In another arrangement, the product will contain between 40–50% fiber material by weight.

Before the material is pulled into a heated die 162, a surface veil 158 may be added, if desired, to enhance the surface appearance of the final product. The veil 158 is added to the outside of the profile prior to entrance of the die. As a result, the finished profile has a resin-rich surface which makes the profile more hand-friendly. The resin soaked fibers and mats, are then passed through preformers or a series of guides 160. The preformers 160 slowly conform the product to its final shape for entry into the heated die 162.

After the preformers 160, the next stage in the pultrusion process is the curing of the composite. The curing or hardening occurs while the wet-out reinforcements are being pulled through the heated die 162. As the resin is a thermoset resin, the heat from the die causes the resin to cure. By the time the part exits the die, a hard part in the exact shape of the die cavity has been formed. The final result is a solid, rigid profile with all the reinforcements, that is the strands and mats, laminated within.

Throughout this process, a puller 164 is gripping and pulling the product. In fact, pultrusion gets its name from this pulling process. A drive system for the puller 164 keeps the product moving. The product exiting the puller 164 passes by a cut-off saw 166, which cuts the product into the desired lengths. It should be appreciated the planar sheets, support members, and angle members are formed by pultrusion. In addition, an alternative embodiment, the entire panel can be formed by pultrusion in a unitary manner.

The present invention has been described in terms of preferred and exemplary embodiments thereof. Accordingly, numerous other embodiments, modifications and variations within the scope and spirit of the appended claims will occur to persons of ordinary skill in the art from a review of this disclosure. For example, while the vault is to be used underground, it need not be fully buried and may be used partially or above ground surface.

What is claimed is:

1. An enclosure for underground use having a plurality of pultruded prefabricated panels formed of a fiber resinous composite matrix, comprising:
   a plurality of interconnecting pultruded vertical panels;
   a pultruded floor panel attached to a lower end of the vertical panels; and
   a pultruded ceiling panel attached to an upper end of the vertical panels,
   wherein said vertical, floor, and ceiling panels include opposing substantially planar sheets attached to a plurality of spaced support members disposed between the sheets and said sheets, and said support members and said planar sheets comprising pultruded unidirectional glass filaments;
   wherein each panel comprise sections that individually do not extend the entire longitudinal length of the panel and wherein ends of the sections abut against each other;
   wherein the plurality of vertical panels comprises opposing longitudinal wall panels and opposing lateral wall panels;
   wherein the enclosure further comprises a plurality of pultruded fiber resin angle members for bonding the longitudinal wall panels to the lateral wall panels at perpendicular interconnections therebetween and said perpendicular interconnections including a cap element mating with said angle members.

2. The enclosure of claim 1, wherein the plurality of vertical panels further comprises a bulkhead panel.

3. The enclosure of claim 1, wherein the longitudinal wall panels and the lateral walls panels include an overlapping joint for attaching to the floor panel and the ceiling panel.

4. The enclosure of claim 1, wherein said vertical panels, said floor panels, and said ceiling panels are unitarily formed.

5. The enclosure of claim 1, wherein the opposing sheets of the vertical panels include an outer sheet on an exterior of the enclosure and an inner sheet in an interior of the enclosure.

6. The enclosure of claim 1, wherein the plurality of pultruded panels includes a unidirectional roving for increasing a stiffness of said panels.

7. The enclosure of claim 1, wherein said vertical wall panels, floor panels and ceiling panels comprise at least 40% fiberglass as measured by weight.

8. The enclosure of claim 1, further comprising a plurality of vertically disposed pultruded connectors interposed between adjacent vertical wall panels for bounding together the adjacent wall panels, said connectors having opposed receiving pockets to receive the wall panels and to seal an interior of said enclosure.

9. An enclosure for underground use having a plurality of pultruded prefabricated panels formed of a fiber resinous composite matrix comprising unidirectional glass filaments, comprising:
   a plurality of interconnecting pultruded prefabricated vertical panels, said vertical panels including at least one of graphite fibers and aramid fibers;
   a pultruded prefabricated floor panel for attaching to a lower end of the vertical panels; and
   a pultruded prefabricated ceiling panel for attaching to an upper end of the vertical panels, wherein said vertical, floor, and ceiling panels include opposing substantially planar sheets attached to a plurality of spaced support members disposed between the sheets; wherein the plurality of vertical panels comprises opposing longitudinal wall panels and opposing lateral wall panels; a plurality of connectors for joining adjacent lateral wall panels and adjacent longitudinal wall panels, wherein each panel comprise sections that individually do not extend the entire longitudinal length of the panel and wherein ends of the sections abut against each other wherein the lateral wall panels and the longitudinal wall panels include ends for interconnecting with said connectors;
   wherein the connectors are bands of fiberglass bonded to the ends of adjacent lateral wall panels and adjacent longitudinal wall panels.

10. The enclosure of claim 9, wherein the bands of fibers are configured to seal an interior of said enclosure.

11. An enclosure for underground use having a plurality of pultruded prefabricated panels formed of a fiber resinous composite matrix comprising unidirectional glass filaments, comprising:
- a plurality of interconnecting pultruded prefabricated vertical panels, said vertical panels including at least one of graphite fibers and aramid fibers;
- a pultruded prefabricated floor panel for attaching to a lower end of the vertical panels; and
- a pultruded prefabricated ceiling panel for attaching to an upper end of the vertical panels, wherein said vertical, floor, and ceiling panels include opposing substantially planar sheets attached to a plurality of spaced support members disposed between the sheets; wherein the plurality of vertical panels comprises opposing longitudinal wall panels and opposing lateral wall panels; a plurality of connectors for joining adjacent lateral wall panels and adjacent longitudinal wall panels, wherein each panel comprise sections that individually do not extend the entire longitudinal length of the panel and wherein ends of the sections abut against each other wherein the lateral wall panels and the longitudinal wall panels include ends for interconnecting with said connectors;
- wherein the connectors are H shaped so that the connectors are interposed between ends of the adjacent lateral wall panels and adjacent longitudinal wall panels such that a portion of the planar sheets are received and bonded to the connectors.

12. The enclosure of claim 11, wherein the connectors further comprise two receiving pockets being opposed longitudinally to receive adjacent wall panels.

* * * * *